United States Patent
Morguet

(10) Patent No.: US 7,729,521 B2
(45) Date of Patent: Jun. 1, 2010

(54) METHOD FOR COMPARISON OF A TEST FINGERPRINT, WHICH IS IN THE FORM OF AN IMAGE STRIP SEQUENCE, WITH A STORED REFERENCE FINGERPRINT, AND A SUITABLE APPARATUS FOR CARRYING OUT THE METHOD

(75) Inventor: Peter Morguet, Munich (DE)

(73) Assignee: Infineon Technologies AG, Neubiberg (DE)

( * ) Notice: Subject to any disclaimer, the term of this patent is extended or adjusted under 35 U.S.C. 154(b) by 1041 days.

(21) Appl. No.: 10/928,646

(22) Filed: Aug. 27, 2004

(65) Prior Publication Data

US 2005/0047633 A1    Mar. 3, 2005

(30) Foreign Application Priority Data

Aug. 28, 2003    (DE)    ................................ 103 39 743

(51) Int. Cl.
G06K 9/00    (2006.01)
(52) U.S. Cl. ........................................ 382/124; 382/126
(58) Field of Classification Search .................. 382/124
See application file for complete search history.

(56) References Cited

U.S. PATENT DOCUMENTS

| | | | | |
|---|---|---|---|---|
| 4,827,527 A | * | 5/1989 | Morita et al. ................ | 382/127 |
| 6,118,890 A | * | 9/2000 | Senior .......................... | 382/125 |
| 6,668,072 B1 | * | 12/2003 | Hribernig et al. ........... | 382/124 |
| 7,120,280 B2 | * | 10/2006 | Biswas et al. ............... | 382/124 |
| 7,190,816 B2 | * | 3/2007 | Mitsuyu et al. ............. | 382/124 |
| 7,194,115 B2 | * | 3/2007 | Uchida ........................ | 382/124 |
| 7,197,168 B2 | * | 3/2007 | Russo ......................... | 382/125 |
| 7,203,347 B2 | * | 4/2007 | Hamid ........................ | 382/124 |
| 2003/0123715 A1 | | 7/2003 | Uchida | |
| 2004/0062427 A1 | | 4/2004 | Biswas et al. | |
| 2004/0114784 A1 | * | 6/2004 | Fujii .......................... | 382/124 |

FOREIGN PATENT DOCUMENTS

| | | |
|---|---|---|
| DE | 101 23 367 A1 | 11/2002 |
| EP | 0 773 508 A2 | 5/1997 |

* cited by examiner

*Primary Examiner*—Bhavesh M Mehta
*Assistant Examiner*—Stephen R Koziol
(74) *Attorney, Agent, or Firm*—Dickstein, Shapiro, LLP.

(57) ABSTRACT

Method of comparing a test fingerprint with a stored reference fingerprint. The stored reference fingerprint and an image strip sequence of the test fingerprint are produced, wherein image strips of the image strip sequence represent different areas of the test fingerprint. Individual distance values between each image strip of the test fingerprint and at least one section of the reference fingerprint using a distance function are determined. An overall distance value from the individual distance values are determined, the overall distance value being a measure of similarity between the test fingerprint and the reference fingerprint.

17 Claims, 4 Drawing Sheets

45
46

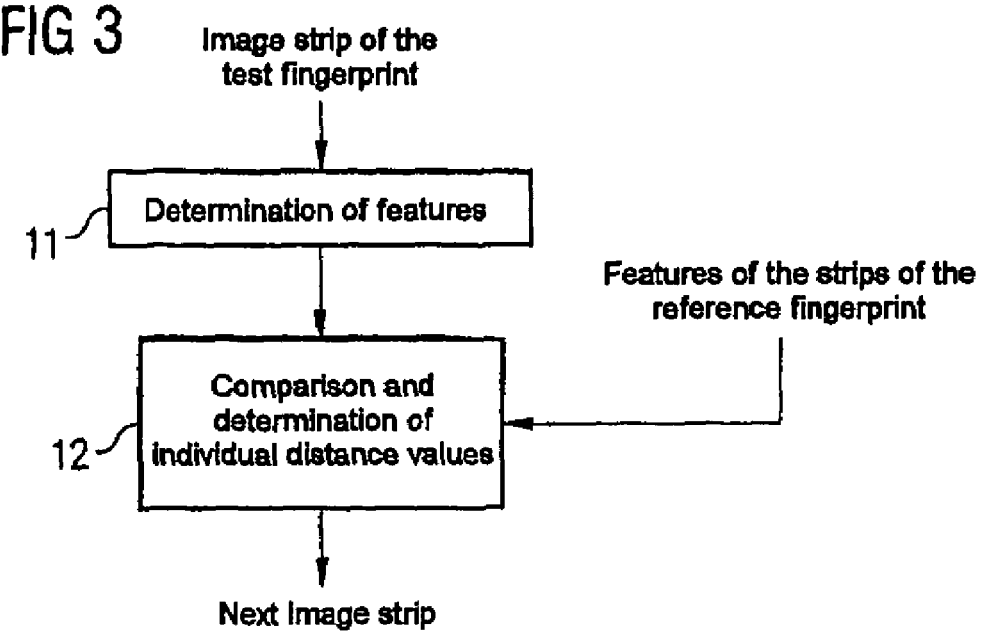
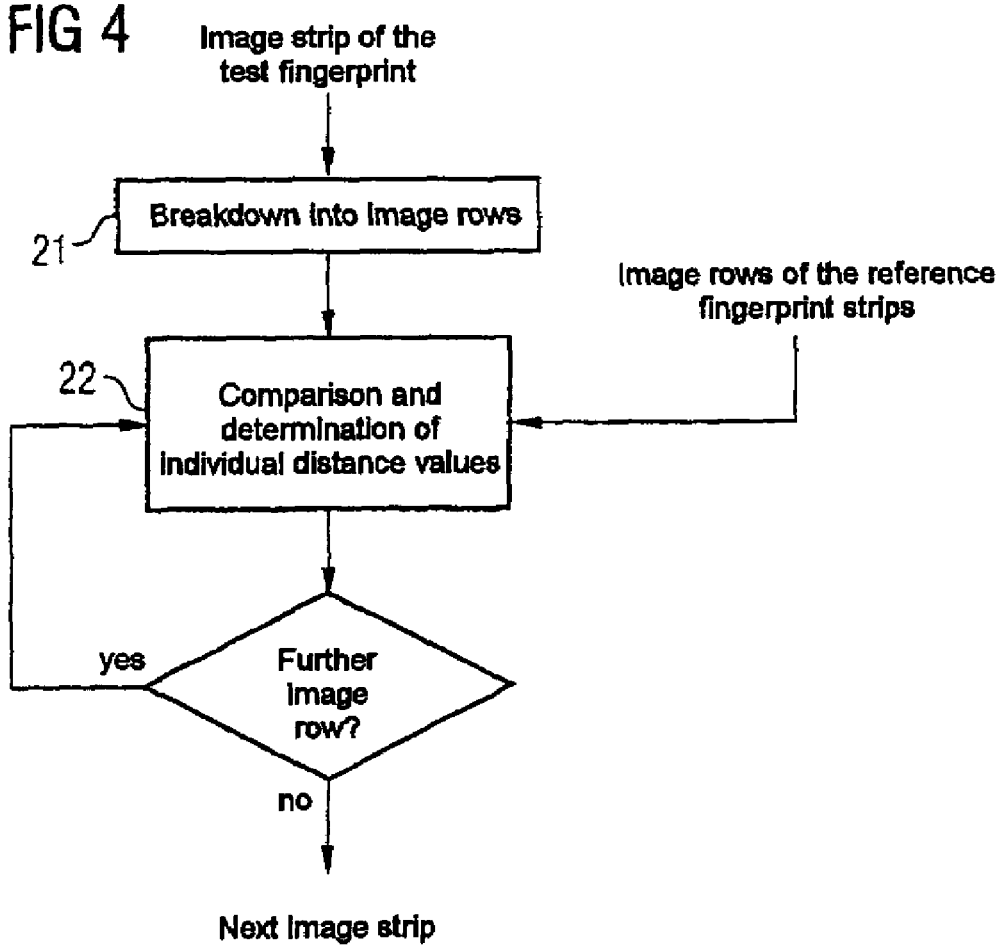

METHOD FOR COMPARISON OF A TEST FINGERPRINT, WHICH IS IN THE FORM OF AN IMAGE STRIP SEQUENCE, WITH A STORED REFERENCE FINGERPRINT, AND A SUITABLE APPARATUS FOR CARRYING OUT THE METHOD

CROSS-REFERENCE TO RELATED APPLICATION

This application is based on German Patent Application Serial No. 10339743.4, which was filed Aug. 28, 2003, and which is incorporated herein by reference in its entirety.

FIELD OF THE INVENTION

The invention relates to a method for comparison of a test fingerprint with a stored reference fingerprint, with the test fingerprint being produced in the form of a sequence of image strips. The reference fingerprint may be in the form of an area image, or likewise in the form of an image strip sequence. The invention furthermore relates to an apparatus for identification of fingerprints by means of a fingerprint sensor, which is in the form of a strip, for recording image strips of a test finger, and having a memory for storage of reference fingerprints as an area image or image strip sequence.

BACKGROUND OF THE INVENTION

In the case of fingerprint sensors, it is known for a sensorally sensitive surface to be provided, which is approximately the same size as a fingerprint. During use, the finger is placed on the sensor surface, and the fingerprint is then read by the appliance. Most fingerprint sensors in use a capacitive semiconductor sensor which identifies a specific capacitance value depending on the local profile of a finger, and uses this to create image information. Owing to the size of the sensorally sensitive surface, semiconductor sensors such as these are very expensive. There is therefore an aim of producing fingerprint sensors which have a smaller sensorally sensitive surface.

EP 0 813 164 A1 discloses the provision of a strip sensor over which a finger is moved. Image strips of the finger are recorded while the finger is being moved over the sensorally sensitive surface. The image strips are produced in a rapid sequence, so that successive image strips overlap, provided that the speed at which the finger is moved does not exceed a specific limit value. A complete area image of the fingerprint is then produced on the basis of these overlaps. In a subsequent identification stage, the reconstructed fingerprint is compared with a reference fingerprint in an analogous manner to the procedure for images recorded by means of an area sensor. This is therefore a two-stage method, in which an area image is first of all reconstructed from image strips, and conventional image comparison methods are then applied.

An undistorted image of the finger is created using the scanned in image strips and, for example, the speed at which the finger is drawn over the sensor surface. In order to make it possible to implicitly determine the speed at which the finger is drawn over the surface from the image strip sequence, successive image strips must overlap. Individual image strips are in turn obtained row-by-row in a sequential process, with the speed at which the rows are read being referred to as the scanning rate. It can be shown that successive image strips will overlap only when the speed at which the finger is drawn over the surface is less than half the scanning rate. This limit value on the speed at which the finger is drawn over the surface greatly restricts the intuitive nature of the usefulness of the sensor. If the speed is exceeded, then the speed at which the finger is drawn over the surface can no longer be reconstructed, or parts of the area image information may even be missing, so that severe distortion can occur in the image reconstruction, making identification impossible.

A further disadvantage of the known method is that, in principle, the reconstruction is not very robust since successive image strips in a strip sequence are only ever reconstructed in pairs. If there is an error in the overlap between two strips, then this error is propagated over the rest of the entire image. Further errors at later times are also additive. In summary, this means that an error may occur which extends over the entire reconstructed image and endangers the subsequent identification if the image information relating to just one single strip is disturbed or its image quality is poor.

A third disadvantage is that the image reconstruction is computation-intensive. Since the subsequent area image identification stage remains unchanged, the reconstruction time in a system such as this is added to the identification time, resulting from the use of an area sensor.

SUMMARY OF THE INVENTION

An object of the invention is to specify a method for comparison of a test fingerprint, which is obtained in the form of an image strip sequence, with a reference fingerprint, and to specify a suitable apparatus in which a low-cost strip sensor may be used, while nevertheless avoiding the computation-intensive reconstruction (which is associated with problems) of an area test fingerprint from the recorded image strips.

According to the invention, this object is achieved by a method for comparison of a test fingerprint with a stored reference fingerprint, having the following steps: an image strip sequence of the test fingerprint is produced, with the image strip reproducing different areas of the test fingerprint, the reference fingerprint is produced, individual distance values are determined between each image strip in the test fingerprint and at least one section of the reference fingerprint by means of a distance function, and an overall distance value is determined from the individual distance values, with the overall distance value being a measure of the similarity between the test fingerprint and the reference fingerprint.

With regard to the apparatus, the object is achieved by an apparatus for identification of fingerprints having a fingerprint sensor in the form of a strip for recording image strips of a test fingerprint, and a memory for storage of reference fingerprints, which is characterized by a comparison apparatus.

The method according to the invention is a direct single-stage approach, in which the test fingerprint and the reference fingerprint are compared without explicit reconstruction of an area image being required from the image strip sequences of the test fingerprint. This makes use of the discovery that there is a short distance between two fingerprints when there is a short distance between the individual image strips, which reproduce different finger areas, of the test fingerprint and image strips of a reference fingerprint (which is in the form of an image strip sequence) or sections of a reference fingerprint which is in the form of an area image. The identification result is thus composed of a number of result elements. The distance between two image sections or image strips is a measure of the similarity of the image sections or image strips. A short distance in this case corresponds to high similarity. Suitable distance functions may be freely defined. Simple distance functions are, for example, the mean square distance, calculated in pixels, between two image sections, or the correlation between the image sections. The different finger areas may be non-overlapping or partially overlapping. The optimum situation for identification is for the image strips to reproduce precisely mutually adjacent areas of a fingerprint. When using a strip sensor to record an image, for example, this condition is satisfied only when the speed at which the finger is drawn over it is matched exactly to the time interval between the recording of two image strips. In practice, this is not possible. If the finger is moved more slowly than the optimum speed, the recorded image strips overlap. This results in more computation complexity than the optimum. If the finger is moved more quickly, this results in gaps between the image strips, so that fewer image strips are available overall for the comparison. This results in a lower identification confidence level.

The influence of variations in the recording of the test and reference fingerprints can be reduced if the images are each converted to a normalized representation. This leads to the expectation that the distance function can be calculated more accurately and more reproducibly.

If the test fingerprint matches a reference fingerprint, that is to say it originates from the same finger, this results in a small overall distance value based on the individual distance values. A comparison of prints from different fingers results in an overall distance value which differs significantly from the overall distance value for two prints from the same finger.

It is particularly advantageous that there are no redundant computational steps, as need to be carried out in the case of a two-stage method on the one hand for image reconstruction and on the other hand for image comparison. The method is thus particularly efficient.

In one advantageous embodiment of the method, the overall distance value is compared with a threshold value, and, if the overall distance value has a defined relationship with the threshold value, it is assumed that the test finger and the reference finger are identical.

In a development of the method, the Viterbi algorithm is used to determine the overall distance value, which makes it possible, inter alia, to compensate for local fluctuations in the speed at which the finger is drawn over the surface. The Viterbi algorithm results in optimum association of the compared image strips, in terms of the overall distance value being as small as possible. In addition, other associations are possible which result in a different overall distance value which, nevertheless however, is a measure of the similarity of the test fingerprint and of the reference fingerprint.

It is advantageous for the identification of image matches for fingerprint-specific features to be determined in advance from the image strips, and for a comparison to be carried out with corresponding features of sections or strips of the reference fingerprint. The fingerprint-specific features of the sections or strips of the reference fingerprint may already be in a stored form.

In one preferred embodiment, the image strips of the test fingerprint and the reference fingerprint are broken down into image rows, and an individual distance value is then determined for each image row. This further improves the identification confidence level, since distortion resulting from fluctuating speeds at which the finger is drawn over the surface have less influence on the analysis of individual image rows.

A further improvement in the identification confidence level is obtained in a development by making a number of records of a reference finger, by using the respective features of the records to train a hidden Markov model, and by comparison of a test fingerprint on the basis of its features with the hidden Markov model of the reference fingerprint. Since the hidden Markov model contains the information from a number of slightly different records of the reference finger, a finger can be identified even in the event of discrepancies in the recorded print resulting from the way in which the finger is drawn over the surface, or the speed at which it is drawn over the surface.

BRIEF DESCRIPTION OF THE DRAWINGS

The invention will be explained in more detail in the following text with reference to exemplary embodiments. In the figures:

FIG. 3 shows an improved method element with feature determination;

FIG. 4 shows an improved method element with image row breakdown;

DETAILED DESCRIPTION OF THE PREFERRED MODE OF THE INVENTION

Figure 1:
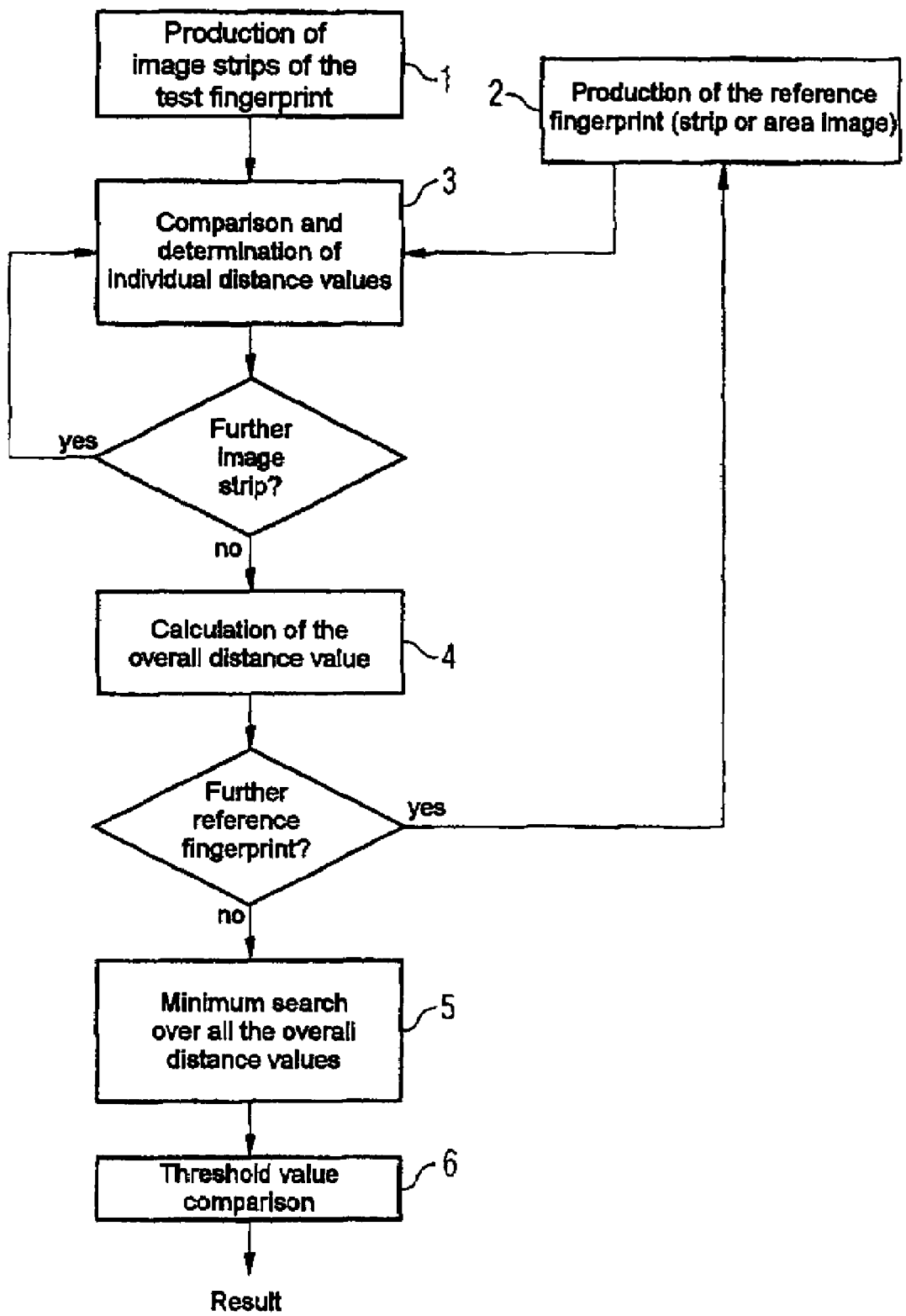
FIG. 1 shows a flowchart of one simple embodiment of a method according to the invention.

FIG. 1 shows the procedure for a method according to the invention. Image strips of a test fingerprint are produced in a first step 1, preferably by means of a capacitive strip sensor, which records image sections of the finger in the form of strips while the finger is drawn over it. The invention is, however, not dependent on the sensor principle. Furthermore, a reference fingerprint is produced in a step 2, for example from a memory. The reference fingerprint may be in the form of image strips or an area image, in which case one image strip of the test fingerprint would in the latter case be compared with sections of the reference fingerprint, in order to carry out a comparison process.

Whether the reference fingerprint is stored in the form of a strip sequence or as an area image depends, for example, on the method for production of the fingerprint. If the reference fingerprint is likewise obtained by means of a strip sensor, which may also be identical to the strip sensor used for recording the test fingerprint, it is better to store it as an image strip sequence since this avoids the problems that occur in image reconstruction.

Since all the image strips are potentially included in the calculation and no overlap need be evaluated, the image strips may be very narrow. Wide strips are rather disadvantageous, since they make it more difficult to calculate the distance values.

In another application, the reference fingerprint is recorded by means of an area sensor, for example in a central department which is responsible for organization security, so that the fingerprint can be stored as an area image, without creating any additional problems.

During the subsequent comparison in step 3, an image strip of the test fingerprint can be tested both against the strips of the reference fingerprint and against an area image of the reference fingerprint. During the comparison of the image strip with the reference fingerprint, individual distance values are obtained and are temporarily stored. The following description of the method is based on the assumption that the reference fingerprint is likewise in the form of a strip sequence.

During the comparison of the two strip sequences, those image strips which produce the best match must be associated with one another, that is to say each image strip of the test fingerprint is tested against all the image strips of the reference fingerprint. In this case, an individual distance value between in each case one image strip of the test fingerprint and one image strip of the reference fingerprint are determined by means of a distance function. The distance function is a function which is applied in pairs to in each case one image strip of the test fingerprint and one image strip of the reference fingerprint. One simple, suitable function is, for example, the mean square distance, calculated in pixels, between the two images.

A correlation, possibly in normalized form, may likewise be used as the distance function. Depending on the permissible degree of freedom, for example shifting in two dimensions, rotation, compression or expansion, the test and reference image strips may in this way be made to coincide more accurately.

In all cases, it is generally advantageous to change the images to a normalized representation before calculation of the distance function, in order to compensate for variations in the recording process.

If the reference fingerprint is in the form of an area image, the individual distance values between an image strip of the test fingerprint and sections of the reference fingerprint are determined.

The advantage of using an area image instead of an image strip sequence for the reference fingerprint is that the individual distance values are determined more accurately, since larger parts of the image strips of the test fingerprint can generally be made to coincide in the area image. At the same time, however, this also increases the computation complexity, since a large search area has to be processed.

Figure 2:
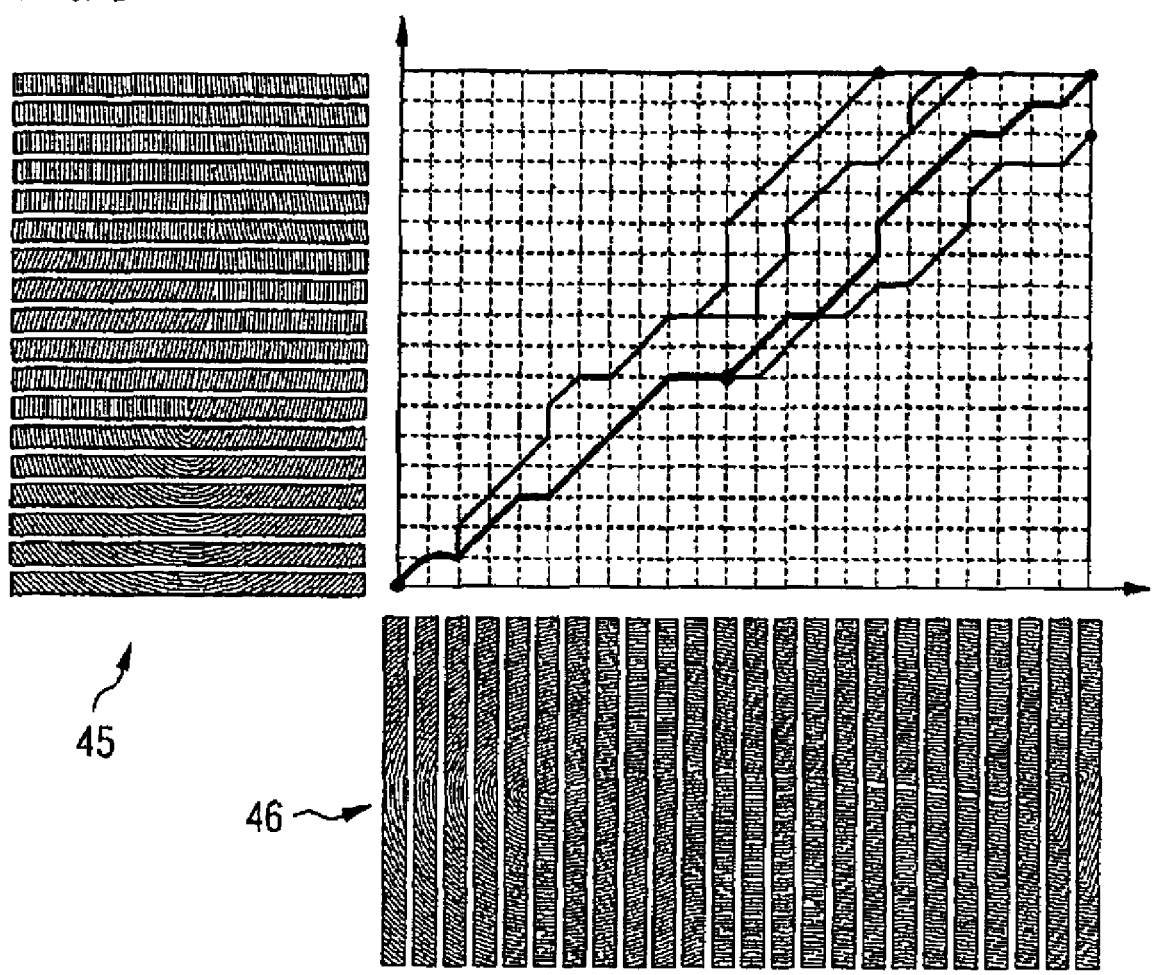
FIG. 2 shows a diagram with possible association paths.

The information relating to the distance between in each case one image strip of the test fingerprint and the reference fingerprint is stored as a set of individual distance values. After repetition of the comparison process for each image strip of the test fingerprint, a matrix is obtained with the determined individual distance values, as is illustrated in FIG. 2. Each matrix element represents one individual distance value, which is obtained by the comparison of an image strip of the test fingerprint (rows) with an image strip of the reference fingerprint (columns).

In the next step, the individual distance values in the matrix must be assessed jointly in order to obtain a statement about the magnitude of the distance between the test fingerprint and the reference fingerprint as an entity. This is done by forming an overall distance value from the individual distance values (step 4). This is done, for example, by adding the individual distance values which are in each case the shortest with respect to an image strip of the test fingerprint. This can be illustrated graphically on the basis of an association path which connects those matrix elements which are included in the overall distance value. The individual distance values may in this case also be weighted so that, for example, a diagonal step is included in the overall distance value after multiplying it by a specific factor. The overall distance value is thus a measure of the similarity of the test fingerprint to one of the stored reference fingerprints.

The comparison is carried out for all the other available reference fingerprints. This results in a number of overall distance values corresponding to the number of reference fingerprints.

A minimum search of these overall distance values is carried out in a step 5. The smallest overall distance value is obtained for the reference fingerprint which is most similar to the test fingerprint.

In practical embodiments, even the smallest overall distance value will very probably not be zero, since this would indicate that the test fingerprint is completely identical to the reference fingerprint. However, since the test fingerprint is always subject to recorded fluctuations, this always results in an overall distance value greater than zero.

However, the overall distance value can be compared with a threshold value in a step 6, with the assumption being made that this is the same finger if the overall distance value is lower than the threshold value. If the overall distance value is higher than the threshold value, the probability that the test finger and the reference finger are identical is regarded as not being adequate. The threshold value is set at a higher or lower level depending on the desired security, in which case the threshold value must be set to be relatively low for very reliable identification, while a higher threshold value is predetermined for a less security-critical application, so that a fingerprint is still identified as matching the reference fingerprint even when greater discrepancies occur. The result of the comparison is then output.

Adjacent distance values in the matrix often differ only slightly. It is therefore not possible to state with confidence which comparison strip can be associated with one image strip of the test fingerprint. There are thus a large number of possible associations. The paths indicated in the matrix in FIG. 2 represent different possible association functions. The respective overall distance value can be determined along the paths. That path for which the lowest overall distance value was determined corresponds to the optimum association function between the image strips of the test fingerprint and the image strips of the reference fingerprint.

When determining the overall distance value, it must be remembered that the image strip sequences will generally have been obtained with the finger being drawn over the surface at different speeds, and with local fluctuations. Fluctuations such as these make it harder to determine an optimum association function. On the one hand, drawing the finger over the surface at a different speed means that the geometric distance between two successively recorded strips is different. On the other hand, this results in distortion within the individual strips.

With the resolution set to be very fine for these reasons, this results in a large number of image strips and a number of possible paths, that is to say possible association functions, which is exponentially dependent on this number of image strips. Determination of all the possible association functions and of the overall distance values which result from them is highly computation intensive and time-consuming.

In one preferred embodiment, the Viterbi algorithm is therefore used to determine the association function which leads to an optimum overall distance value, that is to say an overall distance value which is as small as possible, with the computation complexity nevertheless being relatively low. Methods based on the Viterbi algorithm are also known by the expressions dynamic time warping (DTW) or DP methods.

The Viterbi search is used to calculate an association function which globally maps the test sequence optimally onto the reference sequence. While the Viterbi search is being carried out, the search is in each case carried out recursively, looking backwards, to look for the path via the iteration steps carried out prior to this time which gives the best result. The search is continued on the basis of the best result, that is to say the lowest overall distance value determined so far. While the number of possible paths increases exponentially with the number of image strips, the complexity for a Viterbi investigation is considerably less.

There is no need to explicitly calculate the associations when carrying out the Viterbi search since all that is important is the minimum overall distance value that results at the end of the Viterbi search. This value can then be used to assess the probability of the test fingerprint and the reference fingerprint originating from the same finger. The way in which the overall distance value was obtained, that is to say the course of the path which results in this overall distance value, is irrelevant to the assessment.

In order to speed up the calculation, a corridor can be predetermined within whose boundaries the individual distance values are determined and/or paths to form the overall distance value are considered. Thus, with reference to FIG. 2, the individual distance values would be determined only in a corridor along the diagonals of the matrix, while the other matrix elements would be ignored in the determination of the overall distance value.

In the illustration in FIG. 2, the path shown by a bold line has led to the smallest overall distance value. The association which has led to the smallest overall distance value can be visualized by using a backtracking method, as is done in FIG. 2. This is dependent on information about the local transitions in the course of the iteration process being stored while carrying out the Viterbi search. However, backtracking is not necessary in order to determine the similarity between the fingerprints.

The method according to the invention has a number of advantages both with and without a Viterbi search. The speed at which the finger is drawn over the surface may now be sufficiently high that successive image strips do not overlap. The image strips can be associated with the reference fingerprint over a wide speed range. In comparison to the two-stage approach described initially, in which a reconstruction is first of all carried out followed by identification, the method according to the invention is considerably more robust since errors in individual image strips do not propagate and cannot add up to form an accumulated error.

The similarity calculations carried out between image strips are used directly for identification in the method according to the invention. Thus, in contrast to the two-stage method, no redundant calculations are carried out.

In comparison to area sensors, a fingerprint sensor which operates on the basis of the method according to the invention has cost advantages, since the required sensor area is much smaller.

FIG. 3 shows an improvement for comparison of the image strips of the test fingerprint with the reference fingerprint. In this case, features which describe the image strips (step 11) are first of all obtained from the pixels in an image strip. These are fingerprint-specific features, while other features which, for example, are created by a different pressure while reading the image strip or by other discrepancies during use, are ignored. The amount of data to be processed is thus considerably less. The comparison is now carried out using features of the image strips of the reference fingerprint which have been determined in the same way. The determination of the fingerprint-specific features of the image strips of the reference fingerprint can be carried out once after reading a reference fingerprint, so that only the fingerprint-specific features of the reference fingerprint need be stored, but not the entire image.

The features of the image strips of the two fingerprints are compared in a step 12, and the corresponding individual distance values are calculated, and are then used to calculate the overall distance value.

The method shown in FIG. 3 can be used in an analogous manner by using an area image instead of an image strip sequence for the reference fingerprint.

FIG. 4 shows a further improvement to the method. In this improved method element, the image strips are first of all broken down into individual image rows (step 21). The individual distance values are then determined in step 22 for each image row, until an individual distance value is produced for all the image rows of all the image strips. Distortion of the image strips is thus less important than when comparing entire image strips with the reference fingerprint. The method shown in FIG. 4 can be combined with the method shown in FIG. 3, what is to say with fingerprint-specific features being extracted from each image row, and being compared with corresponding features of the reference print.

In this variant of the method according to the invention as well, the Viterbi algorithm may be used for the subsequent determination of the overall distance value. The determination of the individual distance values is thus simpler and, in addition, effects such as compression and expansion of the individual image strips are automatically compensated for. The main difference from the method shown in FIG. 1 is that, according to FIG. 4, one individual distance value is obtained for each image row while, according to FIG. 1, one individual distance value is determined for each image strip.

In an alternative refinement of the method, which is not illustrated in the figures, one individual distance value is determined for each image strip, although this individual distance value is obtained from distance values between image rows of two image strips. The alternative method can be described briefly by stating that the image strips are first of all broken down into image rows, individual distance values relating to the image strips are then determined between the image rows on the basis of the distance values, and, in a subsequent step, as described above, an overall distance value is calculated from the individual distance values for the image strips. In one advantageous refinement, the Viterbi algorithm is in fact used for determination of the individual distance values between two image strips in each case.

Figure 5:
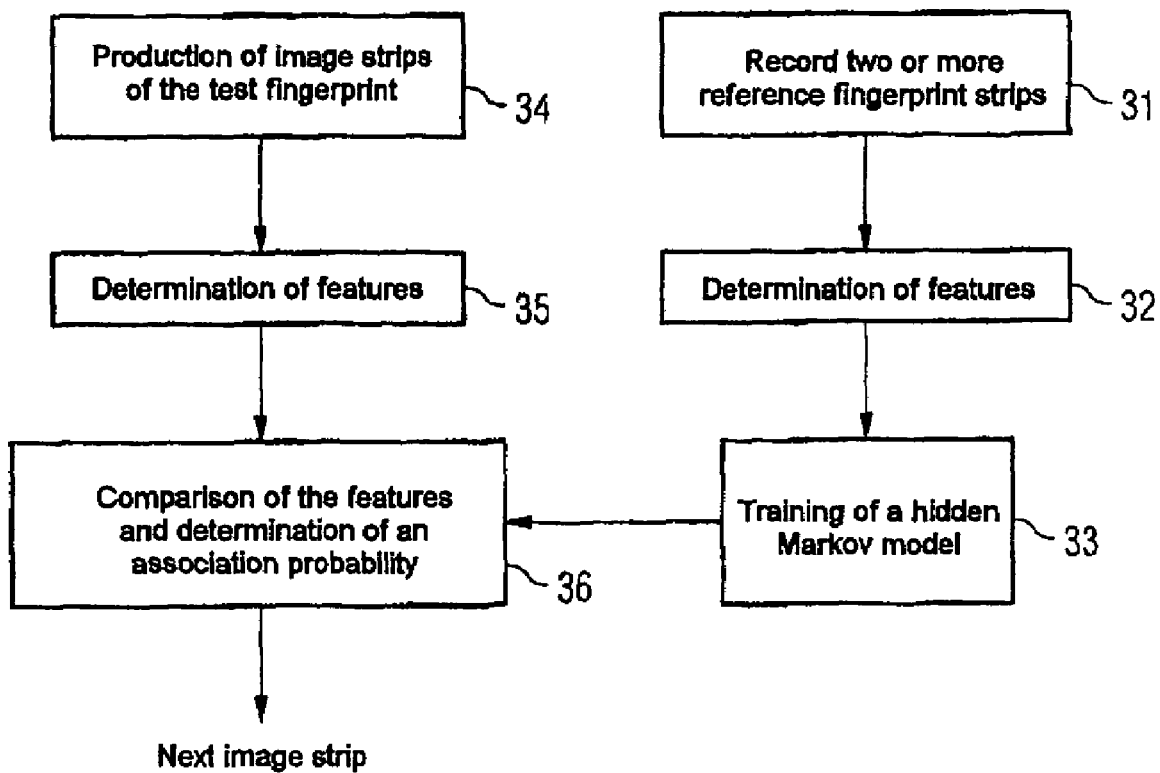
FIG. 5 shows an improved method element using a hidden Markov model.

A further improvement to the identification confidence is achieved, as shown in FIG. 5, by the use of so-called hidden Markov models. Hidden Markov models may be represented as a state diagram, with the nodes being formed by the probability density of feature vectors which are obtained from features of image strips. The state changes are formed by transition probabilities. These hidden Markov models are trained using the features of a number of records of the reference fingerprint, so that the hidden Markov model represents a statistical description of the reference fingerprint. The more often the reference finger is scanned and the features determined in this way are available for training of the hidden Markov model, the better is the mapping of the finger by means of the model.

A hidden Markov model is produced by the steps 31, 32 and 33. A number of reference fingerprints, in the form of strips, of the same finger are recorded in the first step 31. Fingerprint-specific features are then determined from all the recorded reference fingerprint strips (step 32). The hidden Markov model is trained in the step 33, using the features determined in step 32.

Once an image strip of a test fingerprint has been recorded in a step 34, features of the image strip are determined in a step 35, corresponding to the step 32. The comparison process in step 36 is carried out by comparing the features of the image strip of the test fingerprint with the hidden Markov model. Once again, the Viterbi algorithm may be used for testing the features of the test fingerprint image strip against the hidden Markov model.

Figure 6:
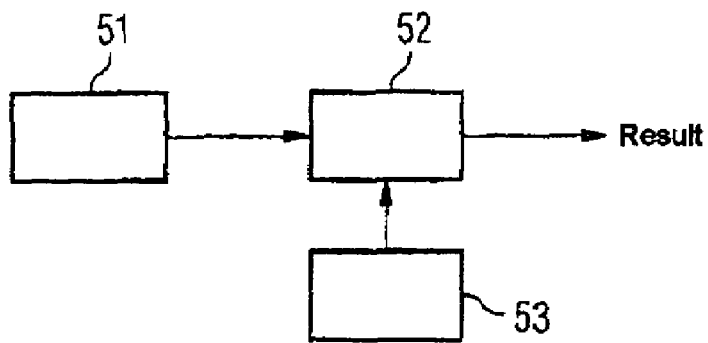
FIG. 6 shows a schematic illustration of an apparatus according to the invention for identification of fingerprints.

FIG. 6 shows the schematic configuration of an apparatus according to the invention for identification of fingerprints. Image strips of a test fingerprint are recorded by means of a fingerprint sensor 51 in the form of a strip, and are passed to a comparison apparatus 52. Furthermore, a memory 53 is provided, in which information about reference fingerprints is stored. This information is stored either in the form of area images, strip images or features of area or strip images. Hidden Markov models can likewise be stored in the memory 53. The memory 53 is likewise connected to the comparison apparatus 52. The comparison apparatus 52 now carries out comparisons between the recorded test fingerprint and the stored reference fingerprints, or the stored features of the reference fingerprints, using one of the methods described above, and outputs the result of the comparison.

The invention claimed is:

1. A method of comparing a test fingerprint with a stored reference fingerprint, comprising:
    producing an image strip sequence of the test fingerprint, by a fingerprint sensor, wherein image strips of the image strip sequence represent different areas of the test fingerprint;
    producing the reference fingerprint from memory, wherein the reference fingerprint is produced in an image strip sequence, and image strips of the image strip sequence represent different sections of the reference fingerprint;
    determining individual distance values, using a distance function, between each image strip of the test fingerprint and at least one section of the reference fingerprint;
    calculating a sum function using the individual distance values to determine an overall distance value, which is a measure of similarity between the test fingerprint and the reference fingerprint;
    comparing the overall distance value, by a comparator, with a threshold value; and
    if the overall distance value has a defined relationship with the threshold value, assuming the test fingerprint and the reference fingerprint are identical.

2. The method according to claim 1, wherein the overall distance value is determined using a Viterbi algorithm.

3. The method according to claim 1, further comprising:
    comparing the test fingerprint with a plurality of reference fingerprints, each comparison resulting in an overall distance value; and
    determining a minimum overall distance value.

4. The method according to claim 1, wherein the image strips of the test fingerprint do not overlap.

5. The method according to claim 1, further comprising calculating an association function between the image strips of the test fingerprint and sections of the reference fingerprint from the individual distance values.

6. The method according to claim 1, wherein the step of determining the individual distance values is based on a normalized correlation between the image strips of the test fingerprint and sections of the reference fingerprint.

7. The method according to claim 1, further comprising:
    breaking down the image strips of the test fingerprint into image rows; and
    determining individual distance values between the image rows and the at least one section of the reference fingerprint.

8. The method according to claim 1, further comprising:
    breaking down each image strip of the test fingerprint into image rows before determining the respective individual distance values;
    determining a distance value for each image row; and
    determining the individual distance value for each image strip using the distance values of the image rows of the respective image strip.

9. The method according to claim 8, wherein the step of determining the individual distance value for each image strip using the distance values of the image rows of the respective image strip includes using a Viterbi algorithm.

10. The method according to claim 1, wherein the image strips of the test fingerprint are recorded using the fingerprint sensor in a form of a strip.

11. The method according to claim 10, further comprising image-conditioning preprocessing the image strips after the image strips are stored.

12. The method according to claim 1, further comprising:
    determining fingerprint-specific features from the image strips and from sections of the reference fingerprint; and
    determining a similarity between image strips and the sections of the reference fingerprint, using the fingerprint-specific features.

13. The method according to claim 12, further comprising storing the reference fingerprint in a form of fingerprint-specific features in a memory.

14. The method according to claim 1, wherein the step of determining the individual distance values includes calculating a Euclidean distance between feature vectors of the image strips.

15. The method according to claim 1, further comprising:
    training a hidden Markov model using features from two or more reference fingerprints; and
    comparing the test fingerprint using its features with respect to the hidden Markov model of the reference fingerprints.

16. The method according to claim 15, wherein the comparison step includes using a Viterbi algorithm.

17. An apparatus for identifying fingerprints comprising:
    a fingerprint sensor in a form of a strip configured to record image strips of a test finger;
    a memory having stored reference fingerprints; and
    a comparator designed to carry out the method according to claim 1.

* * * * *